United States Patent [19]
Romero

[11] 3,803,812
[45] Apr. 16, 1974

[54] ANTI-SMOG DEVICE - FILTRATION MECHANISM

[76] Inventor: Carlos V. Romero, 17116 Wildemere, Detroit, Mich. 48221

[22] Filed: Oct. 5, 1972

[21] Appl. No.: 295,181

[52] U.S. Cl............... 55/228, 55/256, 55/338, 55/DIG. 30, 261/DIG. 9, 261/124
[51] Int. Cl.............................................. B01d 47/04
[58] Field of Search ............. 55/222, 228, 255, 256, 55/338, DIG. 30; 261/77, 121, 124, DIG. 9

[56] References Cited
UNITED STATES PATENTS
| | | | |
|---|---|---|---|
| 1,594,324 | 7/1926 | Payne | 55/228 |
| 2,833,528 | 5/1958 | Schroeder | 55/256 |
| 3,520,113 | 7/1970 | Stokes | 261/121 R |

Primary Examiner—Bernard Nozick
Attorney, Agent, or Firm—Cullen, Settle, Sloman & Cantor

[57] ABSTRACT

An anti-smog filtration system receives exhaust gases from a burning device and passes them through a chemical solution for separating the particulates into the solution. The remaining exhaust gases are recirculated for further separation of particulates into the solution and exhausted. The impregnated solution is passed through a mechanical filtration tank for removal of particulates therefrom and the remainder going to drain.

For further reduction of solids from the exhaust gases, they are delivered into a second solution containing tank for placing more particulate into the solution, the remainder being exhausted to atmosphere. The impregnated solution is circulated through a mechanical filter and drain and at the same time, a replenishing solution is pumped into the tank.

13 Claims, 3 Drawing Figures

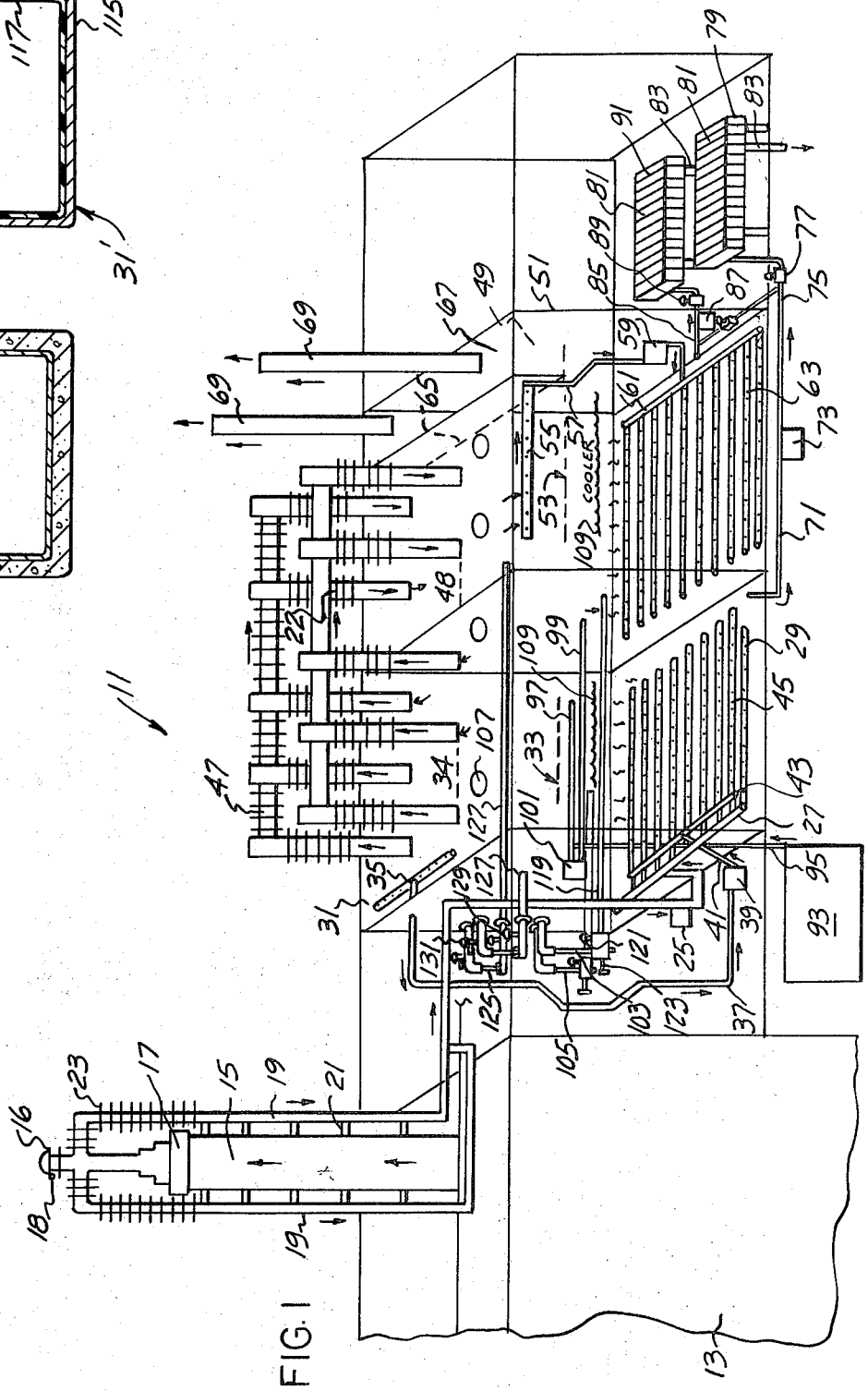
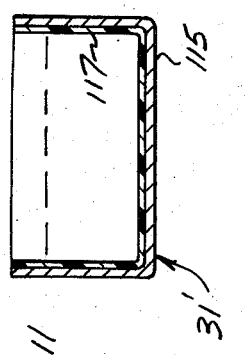
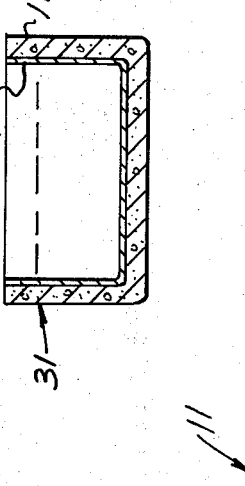

3,803,812

ANTI-SMOG DEVICE - FILTRATION MECHANISM

BACKGROUND OF THE INVENTION

To date, there has been an ever-existing problem in the production of smog into the atmosphere as a result of burning or heating operation including the production of steam or the production of cement or for that matter, any burning process which includes exhaust gases having solid particulates therein.

Various involved filtration mechanisms have been attempted in an effort to eliminate as much as possible particulates from exhausts from burning devices such as furnaces or the like but, wherein, the systems heretofore employed have been inefficient, or costly or complicated and unsatisfactory.

BRIEF DESCRIPTION OF THE INVENTION

It is an object of the present invention to provide an improved anti-smog filtration system which collects all of the exhaust gases from a burning device and delivers them into and recirculates them through a chemical containing solution for the removal of particulate solids therefrom and wherein, this recirculation of gases with remaining particulates may go into a second solution for further separation of particulates therefrom and wherein, clean exhaust air is delivered to atmosphere.

It is another object to provide mechanical filtration device in conjunction with the fluid tanks for receiving any fluids collected and pumped therefrom for mechanically separating much of the particulate trapped in the solution.

It is another object to provide a continuous process by which solution from an independent solution containing tank may be pumped as desired into the main fluid tanks as needed for maintaining a predetermined level of fluid therein.

It is another object to provide in a filtration system fluid containing tanks with means for circulating and recirculating exhaust gases and the particulates therein through the said solution for entrapping the same and delivering clean exhaust to atmosphere and providing an efficient filtration means for mechanically removing exhaust gas particulate from the tanks.

These and other objects will be seen from the following specification and claims in conjunction with the appended drawing in which:

FIG. 1 is a schematic diagram of the present antismog filtration system;

FIG. 2 is a fragmentary vertical section of one form of tank employed;

FIG. 3 is a similar view of another form of tank.

It will be understood that the above drawing illustrates schematically one preferred embodiment of the invention, and that other embodiments are contemplated within the scope of the claims hereafter set forth.

DETAILED DESCRIPTION OF THE INVENTION

Referring to FIG. 1, the present anti-smog filtration mechanism is generally indicated at 11 in conjunction with any burning device such as a furnace or a kiln or an incinerator 13 having an exhaust stack 15 for the normal delivery of the products of combustion, such as exhaust gases and particulate to the atmosphere.

The present anti-smog filtration system provides a means by which these exhaust gases instead of being delivered to atmosphere go into the filtration system for the removal of said particulates before exhausting to atmosphere.

For this purpose, cap 17 overlies the exhaust outlet of said stack and has joined thereto the exhaust conduit 19 which is secured by brackets 21 along the height of said stack and which have thereon a series of longitudinally spaced cooling fins 23 for reducing the temperature of the exhaust gas flowing therethrough.

A suction blower 25 is connected to exhaust conduit 19 and has an outlet delivery which extends into the lower portion of first tank 31 provided in a building and which is completely enclosed and which contains at a predetermined liquid level as at 33, a solution of water and a chemical, such as lime water for illustration. A suitable chemical for the desired solution in the particular exhaust may vary, such as the use of acetic acid or vinegar in a water solution when treating the exhaust products from the cement manufacturing or burning kiln.

A delivery outlet from said exhaust conduit is connected to a first manifold header 27 adjacent the bottom of tank 31 and has connected thereto a series of parallel spaced longitudinally perforated pipes 29 which are closed at their outer ends for the forced delivery of exhaust gases into said solution throughout the bottom area of said tank.

Within tank 31 above the liquid level is a first chamber 34 which, through one side wall of the tank has a recirculation outlet 35 connected to recirculation pipe 37 which at its end, has a delivery outlet 41 which projects into tank 31 directly above the first manifold header 27.

A suitable suction blower 39 is interposed in pipe 37 for the forced recirculation of particulate containing exhaust gases from chamber 34 back into the solution 33 within tank 31.

The outlet 41 connects a second manifold header 43 spaced above the first manifold header 27. A series of parallel spaced longitudinally apertured pipes 45 are connected to the second manifold header 43 in communication therewith with the outer ends of said pipes closed for the delivery of the recirculated particulate containing gases into said solution in a uniform manner throughout the bottom area of the tank.

A series of transfer pipes 47 with cooling fins 22 are mounted upon tank 31 for communication with chamber 34 at a point remote from the recirculation outlet 35 for delivery of gases which rise from the solution either to atmosphere in the purified condition they are, or for further delivery into the second chamber 48 above the liquid level 53 within a second tank 51.

The second tank also contains the water and chemical solution, such as lime water or a solution of such other chemical as desired, taking into consideration the nature of the particulate involved in the exhaust gases.

Elongated recirculation outlet 55 is arranged within the upper portion of the second tank 51 at a point remote from the delivery of the conduits 47 for receiving the exhaust therefrom and for delivering the same through the conduit 57 which is connected at its lower end through the wall of the second tank into the third manifold header 61, FIG. 1, with blower 59 interposed.

Said manifold header has connected thereto a series of parallel spaced longitudinally perforated gas delivery pipes 63, which are closed at their ends, to thus provide for the uniform distribution of the recirculated gases into the solution contained within and at the bottom of tank 51.

The partition baffle 65 within chamber 48, FIG. 1, provides a separate exhaust chamber 67 at the top of the second tank which extends down to the fluid therein to provide communication with the rising gases from the fluid in said second tank into the upper area 49 thereof and for delivery through the fresh air exhaust stacks 69.

The dirty liquid pipe 71 inlets at one end into the bottom of the first tank 31 and extends to suction pump 73 whose outlet 75 communicates with filtration tank 79, with a suitable hand valve 77 interposed.

Within said tank are a series of replaceable mechanical filters 81 for separating from the dirty fluid pumped thereinto a large portion of the particulate which has been removed from the exhaust gases and with the remaining fluid leaving the tank through the drain 83.

A second dirty liquid conduit 85 inlets into the bottom portion of the second tank 51 and is connected to a suction pump 87 for delivering dirty fluid to the second filter tank 91 with a suitable hand valve 89 interposed and, wherein, there is also provided drain 83.

From time to time, the mechanical filters within the filter tanks can be removed and replaced as needed.

A solution containing tank 93 is provided spaced from but adjacent to tanks 31 and 51. Outlet pipe 95 from the solution tank is connected to a pair of separate delivery pipes 97 and 99 with suitable pumps 101 interposed for the separate delivery of replenishment solution back into the respective first and second tanks 31 and 51 for maintaining a predetermined liquid level as designated by the tank liquid level indicators 103 and 105.

While the tanks are maintained air tight for normal operation, manholes and removable covers 107 are provided to permit access to the interior of the tanks for servicing.

It is contemplated that under some circumstances, filtration and separation of particulates in the solution is more efficient and satisfactory with further cooling. For this purpose, there is provided upon the interior walls of the respective tanks additional cooling system designated at 109 which may circulate cold water or a brine or may be provided with suitable refrigeration coiling to reduce the temperature level of the solutions within the respective tanks.

FIG. 2 schematically illustrates one form of tank such as tank 31, wherein, the outer wall 111 consists of concrete having a thickness from 8–12 inches and includes a liner 113, of stainless steel or plastic material which is non-corrosive or chemically inert.

A modified form of tank is shown at 31' in FIG. 3, wherein, outer wall 115 of the tank is constructed of metal one-fourth to one-half inches thick, and there is provided a liner 117 of stainless steel or an inert plastic material.

In the illustrative form of the present invention, it has been generally stated that a lime water is employed as being highly efficient for removing much of the particulate from the exhaust gases into the said water solution. It is contemplated that other chemicals can be employed for this purpose. The lime water, for example, could normally be a solution of calcium carbonate in the proportions desired or a sodium carbonate or any other caustic or alkalae caustic in a water solution.

There are other situations such as in cement burning kilns where an acid solution may be provided, such as vinegar solution or acetic acid.

EXAMPLE NO. 1

For exhaust gases from the burning of a light fuel, the solution may be water alone or lime and water in a proportion as follows: 1 gallon of lime, 55 gallons of water.

EXAMPLE NO. 2

From the burning of heavy fuels such as coal or oil, for the treatment of exhaust gases, the solution will be as follows: 1 gallon of regular gasoline is first mixed with 55 gallons of water. From the solution produced, 1 gallon of such solution is again mixed with 55 gallons of water.

EXAMPLE NO. 3

In connection with the burning of cement from a cement kiln or in cement production, preparation of a solution of vinegar (acetic acid) 1 gallon mixed with 55 gallons of water. From this solution is taken 1 gallon of same and mixed again with 55 gallons of water for use in the tanks.

EXAMPLE NO. 4

For the products of combustion from cement manufacturer, a solution is produced by a mixture of 1 gallon of nitric acid and 55 gallons of water. From this solution produced, 1 gallon of same is again mixed with 55 gallons of water.

During the operation of the present filtration system, as the fluid becomes darker and reaches the point where it is quite dark, the valves 77 and 89 are opened for the pumping of the dirty water solution to the filtration mechanism for removal from said tanks.

The reduction in fluid level will be indicated in the fluid level gauges at 103 and 105, FIG. 1. Thereafter, with the valves reclosed, the fluid from the solution tank 93 is repumped into the respective tanks by pumps 101 delivering through the conduits 97 and 99 to reestablish the fluid level within the respective tanks.

The solution container 93 is provided with the correct proportions of the desired chemical solution.

Both of the fluid level gauges, 103 and 105, include the tank outlet pipe 119 in communication therewith respectively with cut off hand valve 121 and with fluid level cut off and drain valve 123.

In order to measure the appearance of dirt within the solution in the tank which will not accurately be reflected by the present level of fluid within the pipes 103 or 105, it is first necessary to close the valve 121 and, thereafter, open the valve 123 to drain fluid level gauges. Thereafter, valve 123 is closed and 121 reopened to permit the gauges to refill with fluid corresponding to that upon the interior of the tank for visible measure, at least, of the contamination within the tank which will, thus, show up in the gauges 103 and 105.

Along the upper portion for each of the said tanks there is provided the respective gas check glass 125 with an outlet 127 communicating with the chamber above the fluid level and under the control of a first valve 129.

The upper portion of the check glass 125 includes a further outlet valve 131 by which upon opening of the said valves 129 and 131, a sample of the gas above the fluid level may be taken for testing purposes.

The cap 17 at the top of the stack 15 has at its top a spring biased and normally closed cover 16 with a spring hinge as at 18 to normally maintain the cover closed.

In the event of an excess pressure developing, within the chimney 15, the cover 16 is temporarily open against the bias of the spring hinge 18 to release such pressure. However, it is noted that the cover 16 will normally be biased closed for normal working conditions.

I claim:

1. An anti-smog filtration system for use with a burning device having an exhaust stack with outlet;
a first tank containing a chemical and water solution at a predetermined level and having a first chamber thereabove;
an exhaust conduit at one end connected to said stack outlet and at its other end having a delivery outlet projected into said tank adjacent the bottom thereof;
a suction blower interposed in said conduit;
a first manifold header in said tank connected to said delivery outlet;
a series of parallel spaced longitudinally perforated pipes joined to and projecting from said header and closed at their outer ends, for the uniform delivery of exhaust gases into and throughout the bottom area of said tank;
a gas recirculation pipe at one end projected through said tank wall and into said first chamber, and at its other end having a delivery outlet projected into said tank;
a suction blower interposed in said recirculation pipe;
a second manifold header in said tank adjacent and above the first manifold header and connected to the delivery outlet of said gas recirculation pipe;
a series of parallel spaced longitudinally perforated pipes joined to and projecting from said second manifold header and closed at their outer ends for uniform delivery of recirculated exhaust gases into and throughout the bottom area of said tank;
and exhaust transfer pipes on said tank communicating with said first chamber remote from said gas recirculation pipe for delivering exhaust gas therefrom;
a filtration tank spaced from said first tank and including a series of removable filters and having a drain;
a dirty fluid delivery pipe inletting at the bottom of said first tank and outletting in said filtration tank;
and a pump interposed in said latter pipe;
a fresh solution tank spaced from said first tank;
a delivery pipe between said solution tank and said first tank;
and a pump interposed in said latter delivery pipe for replenishing the solution in said first tank.

2. In the filtration system of claim 1, a series of cooling fins mounted on and around and along said exhaust conduit for cooling the gases flowing therethrough.

3. In the filtration system of claim 1, said solution being a lime water solution.

4. In the filtration system of claim 1, said tanks being of concrete and having a liner selected from the group consisting of stainless steel and plastic material.

5. In the filtration system of claim 1, said tank being of metal and said liner being selected from the group consisting of stainless steel and plastic material.

6. In the filtration system of claim 1, a second tank adjacent the first tank containing a chemical and water solution at a predetermined level and having a second chamber thereabove; said exhaust transfer pipes connected to said second tank and outletting into said second chamber; a second delivery conduit having an elongated gas intake communicating with said second chamber and having a delivery outlet projected into said second tank adjacent its bottom; a suction blower interposed in said second delivery conduit; a third manifold header in said second tank connected to said delivery outlet of said second delivery pipe; a series of parallel spaced longitudinally perforated pipes connected to said third header and closed at their outer ends, for uniform distribution of gas into said second tank solution throughout its area; an exhaust chamber in said second tank partitioned from said second chamber for communication with the fluid in said second tank, receiving gases rising in said second tank; and a series of clear air outlet stacks on the second tank communicating with said exhaust chamber.

7. In the filtration system of claim 6, a second filtration tank spaced from said second tank and including a series of removable filters and a drain; a dirty fluid delivery pipe inletting at the bottom of said second tank and outletting in said second filtration tank; and a pump interposed in said second dirty fluid delivery pipe.

8. In the filtration system of claim 7, a second solution delivery pipe between said solution tank and said second tank; and a pump interposed in said second solution delivery pipe for replenishing the solution in said second tank.

9. In the filtration system of claim 6, a series of air cooling fins on and along said exhaust transfer pipes.

10. In the filtration system of claim 6, said solution including an alkalae carbonate.

11. In the filtration system of claim 6, said solution including calcium carbonate and water.

12. In the filtration system of claim 6, said solution including acidic acid for treatment of exhaust gases from a cement production kiln.

13. In the filtration system of claim 6, and a solution cooling means upon the interior walls of said first and second tanks.

* * * * *